US010779174B2

(12) United States Patent
Bagheri et al.

(10) Patent No.: US 10,779,174 B2
(45) Date of Patent: Sep. 15, 2020

(54) METHOD AND APPARATUS FOR MONITORING CONTROL CANDIDATES BASED ON ASSIGNMENTS OF DATA PACKETS WITH DIFFERENT RELIABILITIES

(71) Applicant: Lenovo (Singapore) Pte. Ltd., New Tech Park (SG)

(72) Inventors: Hossein Bagheri, Urbana, IL (US); Vijay Nangia, Woodridge, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 18 days.

(21) Appl. No.: 16/057,753

(22) Filed: Aug. 7, 2018

(65) Prior Publication Data

US 2019/0053081 A1 Feb. 14, 2019

Related U.S. Application Data

(60) Provisional application No. 62/544,743, filed on Aug. 11, 2017.

(51) Int. Cl.
*H04W 24/08* (2009.01)
*H04W 72/14* (2009.01)
(Continued)

(52) U.S. Cl.
CPC ............ *H04W 24/08* (2013.01); *H04L 5/001* (2013.01); *H04L 5/0055* (2013.01);
(Continued)

(58) Field of Classification Search
CPC ... H04W 24/08; H04W 72/072; H04W 72/14; H04L 5/001; H04L 5/0055; H04L 63/1416
See application file for complete search history.

(56) References Cited

U.S. PATENT DOCUMENTS 8,385,268 B2 * 2/2013 Chen et al. ............. H04L 5/001
2009/0088148 A1    4/2009 Chung et al.
(Continued)

FOREIGN PATENT DOCUMENTS

EP          1988667 A2    11/2008

OTHER PUBLICATIONS

Mircescu, PCT International Search Report, International application No. PCT/IB2018/000979, European Patent Office, Rijiswijk, NL, Dec. 12, 2018.

*Primary Examiner* — Andrew Lai
*Assistant Examiner* — Mohammed M Murshid
(74) *Attorney, Agent, or Firm* — Loppnow & Chapa; Matthew C. Loppnow

(57) ABSTRACT

A first set of control candidates message can be received. The first set of control candidates message can indicate a first set of control candidates with a first set of respective aggregation levels. A data packet assignment can be received in a first transmit time interval. A second set of control candidates with a second set of respective aggregation levels can be determined. The first set of control candidates can be monitored in at least one second transmit time interval if the data packet assignment is a normal reliability data packet assignment. The second set of control candidates can be monitored in the at least one second transmit time interval if the data packet assignment is a high reliability data packet assignment.

24 Claims, 5 Drawing Sheets

(51) Int. Cl.
*H04W 72/04* (2009.01)
*H04L 5/00* (2006.01)
*H04L 29/06* (2006.01)

(52) U.S. Cl.
CPC ....... *H04L 63/1416* (2013.01); *H04W 72/042* (2013.01); *H04W 72/14* (2013.01)

(56) References Cited

U.S. PATENT DOCUMENTS

| | | |
|---|---|---|
| 2013/0083753 A1 | 4/2013 | Lee et al. |
| 2014/0247816 A1 | 9/2014 | Kim et al. |
| 2015/0003242 A1* | 1/2015 | Han et al. .............. H04L 1/0046 370/252 |
| 2017/0223670 A1* | 8/2017 | Chen et al. ......... H04W 72/042 370/329 |
| 2017/0070984 A1* | 9/2017 | Lin et al. .............. H04L 5/0064 |
| 2018/0184410 A1* | 6/2018 | Wilson et al. .... H04W 72/1215 370/329 |

* cited by examiner

METHOD AND APPARATUS FOR MONITORING CONTROL CANDIDATES BASED ON ASSIGNMENTS OF DATA PACKETS WITH DIFFERENT RELIABILITIES

BACKGROUND

1. Field

The present disclosure is directed to a method and apparatus for monitoring control candidates based on assignments of data packets with different reliabilities.

2. Introduction

Presently, wireless communication devices, such as User Equipment (UE), communicate with other communication devices using wireless signals. In current Third Generation Partnership Project (3GPP) Long Term Evolution (LTE) systems, time-frequency resources are divided into subframes where each 1 ms subframe comprises two 0.5 ms slots and each slot with normal Cyclic Prefix (CP) duration comprises 7 Single-Carrier Frequency-Division Multiple Access (SC-FDMA) symbols in time domain in Uplink (UL) and 7 Orthogonal Frequency-Division Multiplexing (OFDM) symbols in time domain in Downlink (DL). In the frequency domain, resources within a slot are divided into Physical Resource Blocks (PRBs), where each PRB spans 12 contiguous subcarriers.

Usually resources are assigned using a 1 ms minimum Transmission Time Interval (TTI) when data is available, referred to as dynamic scheduling. Within each scheduled TTI, in UL, the UE transmits data over a Physical Uplink Shared Channel (PUSCH) in PRB-pairs indicated by an UL grant from the network to the UE, where the UL grant schedules the data transmission. In DL, an enhanced NodeB (eNB) transmits data over a Physical Downlink Shared Channel (PDSCH) in PRB-pairs indicated by a DL grant/assignment. The UL grant and/or DL assignment information is provided to the UE in a control channel, referred to as a (enhanced) Physical Downlink Control Channel PDCCH or EPDCCH. The (E)PDCCH channel carries the control information about the data being transmitted on the current subframe and the information about the resources that UE needs to use for the uplink data.

As mentioned above, there are two types of downlink physical layer control signaling for the purpose of dynamic scheduling. The first type of downlink physical layer control signaling is PDCCH, where the control signaling from an eNodeB is received by a UE e.g., in the first, first two, first three, or first four symbols of a subframe, where these symbols are referred to as control symbols. The remaining symbols in the subframe, following the control symbols, are typically used for receiving user data. User data is received by the UE on the PDSCH and in select Resource Blocks (RBs) of the PDSCH occupying either in the entire carrier bandwidth or a portion of it. The set of PDCCH candidates to monitor are defined in terms of search spaces, where a search space $S_k^{(L)}$ at aggregation level $L \in \{1,2,4,8\}$ is defined by a set of PDCCH candidates. For each serving cell on which PDCCH is monitored, the Control Channel Elements (CCEs) corresponding to a PDCCH candidate of the search space $S_k^{(L)}$ are given by a formula using parameters including the total number of CCEs in the control region of subframe derived from a reduction of Physical Control Format Indicator Channel (PCFICH) and Physical Hybrid Automatic Repeat Request (Hybrid-ARQ) Indicator Channel (PHICH) resources, the aggregation level, the number of PDCCH candidates to monitor in the given search space, and the slot number within the radio frame. A physical control channel is transmitted on an aggregation of one or several consecutive CCEs, where a CCE corresponds to 9 resource element groups. For example, the number of CCEs in a PDCCH is called its CCE aggregation level. Each CCE is equivalent to 36 Resource Elements (REs). One CCE is the minimum PDCCH allocation unit. The number of resource-element groups not assigned to Physical Control Format Indicator Channel (PCFICH) or Physical Hybrid-Automatic Repeat Request (ARQ) Indicator Channel (PHICH) is $N_{REG}$. The CCEs available in the system are numbered from 0 to $N_{CCE}-1$, where $N_{CCE}=\lfloor N_{REG}/9 \rfloor$. A PDCCH consisting of n consecutive CCEs may only start on a CCE fulfilling i mod n=0, where i is the CCE number.

The second type of downlink physical layer control signaling is EPDCCH. For each serving cell, higher layer signaling can configure a UE with one or two EPDCCH-PRB-sets for EPDCCH monitoring. The PRB-pairs corresponding to an EPDCCH-PRB-set are indicated by higher layers. Each EPDCCH-PRB-set consists of a set of ECCEs numbered from 0 to $N_{ECCE,p,k}-1$, where $N_{ECCE,p,k}$ is the number of ECCEs in EPDCCH-PRB-set p of subframe k. Each EPDCCH-PRB-set can be configured for either localized EPDCCH transmission or distributed EPDCCH transmission. For each serving cell, the subframes in which the UE monitors EPDCCH UE-specific search spaces are configured by higher layers.

A UE shall monitor a set of (E)PDCCH candidates for control information, where monitoring implies attempting to decode each of the (E)PDCCH decoding candidates in the set according to the monitored Downlink Control Information (DCI) formats. The set of (E)PDCCH candidates to monitor are defined in terms of (E)PDCCH search spaces.

To reduce latency of communication in LTE, various solutions are being studied. For example, an approach envisioned for future LTE systems is to use shorter minimum TTIs (sTTIs), such as shorter than 1 ms, in UL/DL. Using a sTTI allows the UE to send and receive data using reduced latency when compared to current LTE systems. In addition, acknowledging each or a group containing few sTTI(s) leading to faster acknowledging data, compared to using 1 ms TTI, can help in some applications such as Transmission Control Protocol (TCP) during slow-start phase for users in good channel conditions. For example, in the TCP slow-start phase for DL communication, the network-UE link capacity for a user in good channel conditions can support more data, but the network sends a smaller amount of data because the network is waiting to receive the acknowledgment for the previously sent data due to the TCP slow-start phase. Therefore, faster acknowledgments, such as resulting from using shorter TTI length, would enable the network to better utilize the available network-UE link capacity.

The currently supported sTTI configurations within a subframe is either a combination of 6 sTTIs each composed of 2 or 3 symbols, such as OFDM symbols in DL or SC-FDMA symbols in UL, or two 0.5 ms-length sTTIs. For example, scheduling a UE transmission over a sTTI length of 0.5 ms, such as PUSCH scheduled using a PRB spanning a 0.5 ms in a 1 ms subframe, or scheduling UE transmission over a sTTI length of ~140 us, such as PUSCH scheduled using a shortened PRB spanning 2 SC-FDMA symbols within a slot in a subframe, would not only reduce time taken to start/finish transmitting a data packet, but also potentially reduce the round-trip time for possible HARQ retransmissions related to that data packet.

The PDCCH channel carries the control information about the data being transmitted on the current subframe and the information about the resources which a UE need to use for the uplink data. That means it is mandatory for the UE to decode it successfully if it wants to send some data or receive something. For reduced latency, a shortened PDCCH (sPDCCH) is defined to play a similar role in a sTTI or a group of sTTIs. For PDCCH, allocation of resources happens in terms of CCEs.

As the sTTI length becomes smaller, the control overhead increases, which in turn increases the complexity and hence the processing delay, which could negatively impact the latency reduction offered by low-latency operation.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

DETAILED DESCRIPTION

Some embodiments can provide a method and apparatus for monitoring control candidates based on assignments of data packets with different reliabilities. Also, some embodiments can provide a method and apparatus increasing reliability for low-latency operation.

According to a possible embodiment, a first set of control candidates message can be received. The first set of control candidates message can indicate a first set of control candidates with a first set of respective aggregation levels. An aggregation level can indicate a number of control channel elements in a control candidate of that aggregation level. A data packet assignment can be received in a first transmit time interval. A second set of control candidates with a second set of respective aggregation levels can be determined. The second set of control candidates can be different from the first set of control candidates. The first set of control candidates can be monitored in at least one second transmit time interval if the data packet assignment is a normal reliability data packet assignment. The second set of control candidates can be monitored in the at least one second transmit time interval if the data packet assignment is a high reliability data packet assignment. A high reliability packet data assignment can assign packets with a higher reliability than packets with normal reliability.

According to another possible embodiment, a first set of control candidates message can be sent. The first set of control candidates message can indicate a first set of control candidates with a first set of respective aggregation levels. A first data packet assignment can be sent in a first transmit time interval. A second set of control candidates with a second set of respective aggregation levels can be determined. The second set of control candidates can be different from the first set of control candidates. A control candidate can be selected from the first set of control candidates if the first data packet assignment is a normal reliability data packet assignment. A control candidate can be selected from the second set of control candidates if the first data packet assignment is a high reliability data packet assignment. A high reliability packet data assignment can assign packets with a higher reliability than packets with normal reliability. A second data packet assignment can be sent in the selected control candidate in a second transmit time interval.

Figure 1:
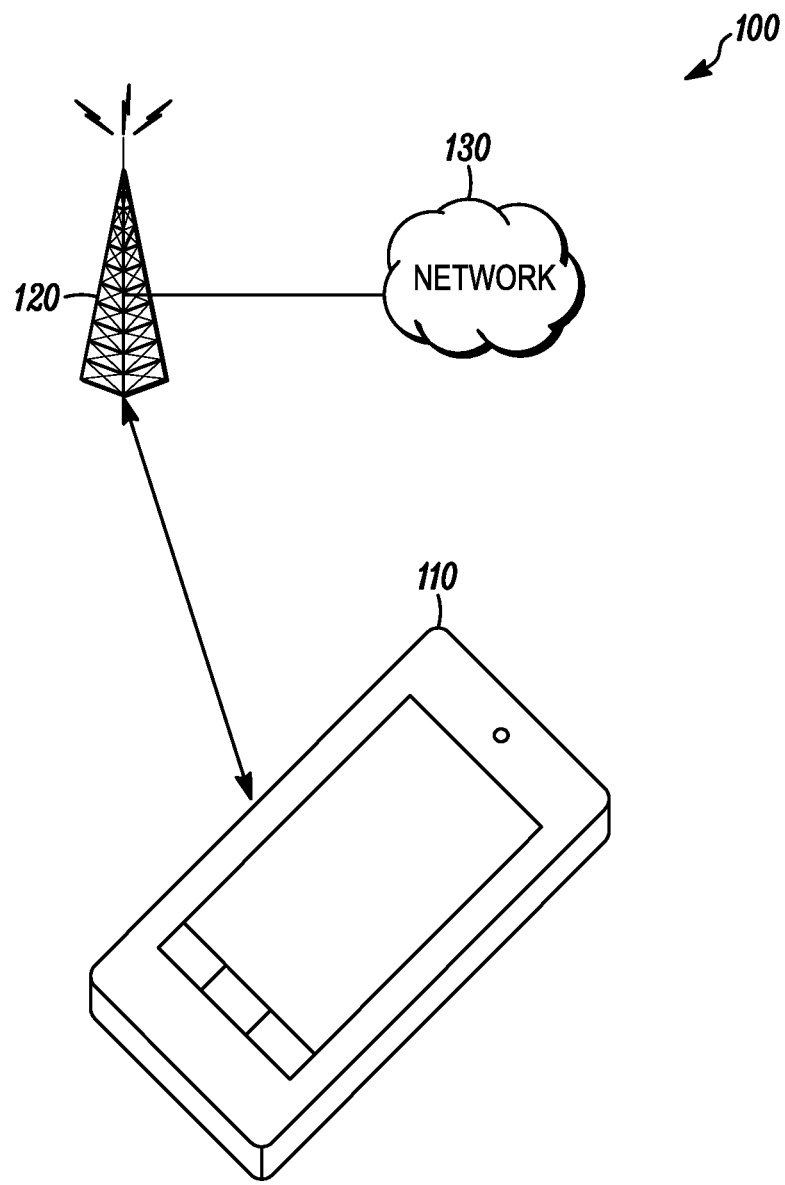
FIG. 1 is an example block diagram of a system according to a possible embodiment.

FIG. 1 is an example block diagram of a system 100 according to a possible embodiment. The system 100 can include a wireless communication device 110, such as User Equipment (UE), a network entity 120, such as a base station, like an enhanced NodeB (eNB), and a network 130. The wireless communication device 110 can be a wireless terminal, a portable wireless communication device, a smartphone, a cellular telephone, a flip phone, a personal digital assistant, a personal computer, a selective call receiver, a tablet computer, a laptop computer, or any other device that is capable of sending and receiving communication signals on a wireless network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3rd Generation Partnership Project (3GPP)-based network, a satellite communications network, a high altitude platform network, the Internet, and/or other communications networks.

In operation, the UE 110 can communicate with the network entity 120 using wireless communication signals. To reduce the control signal overhead, few general approaches are possible. One approach can include scheduling multiple sTTIs via a single grant, such as sent via an sPDCCH or (E)PDCCH command, which can be referred to as multi-sTTI scheduling. Another approach can include sending the control information in a hierarchical manner, such as using more than one step. For instance, a first step can provide a subset of control information common to a set of sTTIs at a first time instant and a second step can provide complementary control information pertinent to each sTTI at a second time instant. Another approach can include sending the control information in each scheduled sTTI, but with some DCI bit field reduction compared to the DCIs used for legacy 1 ms-TTI. For instance, for 2 or 3-symbol sTTI, the Resource Block Group (RBG) size, which can be referred to as sRBG for sTTI, can be larger, such as 2-6 times larger, than the RBG size used for legacy 1 ms-TTI.

Figure 2:
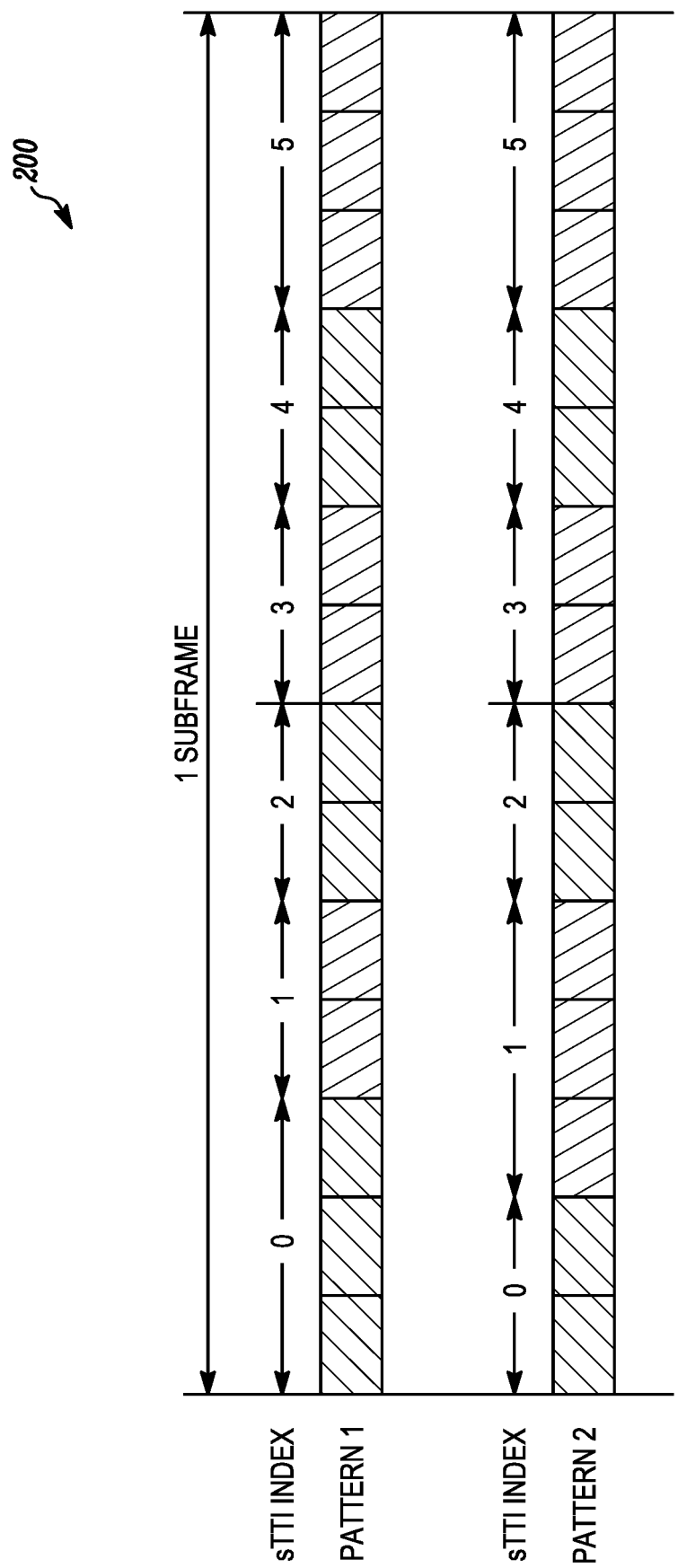
FIG. 2 is an example illustration of a downlink shortened transmit time interval pattern according to a possible embodiment.

FIG. 2 is an example illustration 200 of a DL sTTI pattern according to a possible embodiment. For 2-symbol DL TTI, the sTTI patterns, Pattern 1 and Pattern 2, in OFDM symbols per subframe in the illustration 200 are supported for 2 and 3 OFDM symbol-sTTI configuration. In this case, each pattern in a subframe can include 5 sTTIs.

For a CC configured with a 2-symbol sTTI operation, for a cross-carrier scheduled Control Channel (CC), the starting symbol index of the first potential sPDSCH can be configured by Radio Resource Control (RRC). For a self-carrier scheduled CC, the starting symbol index of the first potential sPDSCH can equal a Control Format Indicator (CFI) value indicated by PCFICH. A UE can determine the sTTI pattern in accordance with Table 1.

TABLE 1

| The starting symbol index of the first potential sPDSCH | 2-symbols DL sTTI pattern |
|---|---|
| 1, 3 | 1 |
| 2 | 2 |

There have been proposals for resource utilization mechanisms to take advantage of unused sPDCCH resources for sPDSCH. Some of those proposals rely on few bits in DL assignment corresponding to a sPDSCH to indicate some or all of the unused sPDCCH resources to be utilized in the sPDSCH allocation.

As mentioned above, some embodiments can provide for increasing reliability of low-latency operation. In particular, in a case of retransmission, a UE can determine the Aggregation Level (AL) of control channel candidates based on the AL of control candidate(s) decoded/detected in one or more of previous transmissions and/or retransmissions. When the UE expects a retransmission, the UE can determine a set of ALs to be monitored from a set of ALs monitored for one or more of the previous (re)transmissions and from a base set of ALs. The base set of ALs can be configured via higher layer signalling, such as via RRC or via Medium Access Control (MAC) Control Element (CE), can be indicated via physical layer signaling to the UE, and/or can be otherwise configured. The UE can then monitor control candidates corresponding to the set of ALs.

In one example, the base set of ALs can be associated with a base set of sPDCCH candidates per AL. In another example, at least one sPDCCH candidate can be monitored in each set of ALs that the UE is configured to monitor when it receives a first sPDSCH transmission. In this case, the base set of ALs to monitor for retransmissions can be equal to the set of ALs that the UE was configured to monitor when it receives a first sPDSCH transmission. In another example, the base set of ALs to monitor for retransmissions can be a subset of the set of ALs that the UE was configured to monitor when it receives a first sPDSCH transmission. For example, the largest AL that is monitored for first transmission can be included in the base set of ALs for retransmission sPDCCH control monitoring.

The term "subframe" can refer to a time domain container spanning a fixed number of OFDM symbols. The term "subframe" can also be used for describing something more, such as a particular set of signals/channels present within the container. For example, "subframe duration" can be 1 ms for a numerology with 15 kHz subcarrier spacing and $\frac{1}{2}^m$ ms for numerology with $2^m \ast 15$ kHz subcarrier spacing. Thus, a subframe can comprise a fixed number of 14 OFDM symbols. The term "TTI" can typically refer to the duration in which the UE can receive/transmit a Transport Block (TB) from higher layers, such as a MAC Protocol Data Unit (PDU) from the MAC layer. Therefore, TTI length can depend on how TBs are mapped to REs and OFDM symbols. The TTI can include resources for a control channel, which can be used for resource assignment within the TTI to the UE.

In shortened TTI operation, minimizing the control overhead is important since control can be present in each sTTI, which is shorter than the regular TTI, such as a 1 ms TTI, where a sTTI is composed of one or multiple symbols, such as OFDM symbols. Also, the number of monitoring attempts to decode control candidates can be limited, as multiple sTTIs are present in a subframe. Thus, in a sTTI, a subset of possible ALs, such as 1, 2, 4, and 8, can be monitored, such as by monitoring two candidates with AL=2 and two candidates with AL=4.

To increase the reliability of transmission in case of retransmission, the reliability of control reception can be increased. The reliability of control reception can be increased by increasing the AL compared to the AL used for the previous (re)transmission in a deterministic way. For example, the AL can be increased to two candidates with AL=2 and two candidates with AL=8 when a UE expects a retransmission instead of monitoring two candidates with AL=2 and two candidates with AL=4 when the UE does not expect a retransmission.

One or more of the following embodiments can be used separately or together. According to a possible embodiment, a first set of control candidates associated with a first AL set can be monitored when a UE does not expect retransmissions and a second set of control candidates associated with a second AL set can be monitored when the UE expects retransmissions. The terms "control candidates" and "control decoding candidates" can be used interchangeably throughout the present disclosure. The first and the second AL sets can be higher layer configured, indicated by physical layer signalling, and/or otherwise configured. The first and/or second set of control candidates can be higher layer configured, indicated by physical layer signalling, and/or otherwise configured. The second set of control candidates can be determined from the first set of control candidates. The second set of ALs can be the same as the first set of ALs, but the second set of control candidates can have more candidates with higher ALs compared to the first set of candidates. In this case, the first and the second set of control decoding candidates have the same number of control decoding candidates. The second set of candidates can be determined from the first set of candidates according to a one-to-one mapping. The second set of ALs can be determined from the first set of ALs from a one-to-one mapping. In one example, at least one element of the second AL set can be two times one element of the first AL set. For example, if AL=4 in the first AL set, then AL=8 in the second set. The second set of ALs can include at least a subset of the first set of ALs. For a common AL in the first set of ALs and the second set of ALs, the number of control candidates in the second set of ALs can be smaller than that in the first set of ALs. The second set of ALs can include an AL that is larger than the largest AL in the first set of ALs.

According to another possible embodiment, to accommodate channel gain changes, a base set of ALs, such as AL=2, can always be monitored and included in the first and second set of ALs in addition to the AL(s) determined from detected ALs corresponding to one or more of previous (re)transmissions, such as AL=8 determined from AL=4. The base AL set can be different for different sets of sTTIs. For example, the base AL set can be different from one subframe to another subframe. The base AL set can be different in terms of candidates, such as location, number, etc., in terms of AL values, such as AL=4 or AL=8, and/or can be otherwise different.

According to another possible embodiment, the number of control candidates monitored in different (re)transmissions can be different, such as to accommodate larger ALs. For example, in the first transmission of a TB, the UE can monitor 2 candidates with AL=2 and 4 candidates with AL=4 and in the first retransmission of the TB, the UE can monitor 2 candidates with AL=2 and 2 candidates with AL=8.

According to another possible embodiment, having a base AL monitored in a sTTI can be used in case the DL assignment/UL grant associated with one of the (re)transmissions, such as the first transmission, corresponding to the TB is missed.

According to another possible embodiment, to accommodate larger ALs in retransmissions, the number of control resources, such as in terms of CCEs, can be different, such as larger, in an sTTI in which the UE expects to receive a DL assignment/UL grant for retransmission. For example, at least two sPDCCH PRB-sets can be defined. One sPDCCH PRB-set can be defined for original transmissions and another sPDCCH PRB-set can be defined for retransmissions. There can be multiple, such as two, sPDCCH-PRB sets corresponding to both original transmissions/retransmissions.

According to another possible embodiment, to accommodate larger ALs in retransmissions, the location of control resources, such as in terms of CCEs, can be different, such as larger, in an sTTI in which the UE expects to receive DL assignment/UL grant for retransmission. For example, a CCE can include a larger number of REGs.

According to another possible embodiment, for each retransmission, the ALs/control candidates can only be determined based on the detected AL/control candidate for the original transmission or the most recent transmission and based on the base AL set to be monitored in all retransmissions. For each retransmission, the ALs can only be determined based on the latest detected AL associated with the TB or the most recent TB on any HARQ process, which may not be the same TB as the TB the retransmission is associated with, and based on the base AL set to be monitored in all retransmissions.

According to another possible embodiment, a UE can monitor the second set of ALs/control candidate sets in a sTTI only if it expects a retransmission of the TB corresponding to a bearer/service with a Quality of Service (QoS) Class Identifier (QCI) or QoS value from a set of high reliability QCI/QoS values or the QCI/QoS value is below a certain threshold in the sTTI. Otherwise, the UE can continue to monitor the first set of ALs/control candidate sets. The QoS of the corresponding TB can be indicated in the DCI for the TB first transmission as part of a bit field in the DCI, or Cyclic Redundancy Check (CRC)-mask specific to a high reliability QoS Cell Radio Network Temporary Identifier (C-RNTI).

According to another possible embodiment, in case of synchronous non-adaptive retransmission, the UE can know in which sTTI it should expect a retransmission. According to another possible embodiment, if the UE does not know in which exact sTTI it should expect a retransmission, it can get a DL assignment/UL grant for retransmission. The UE can then monitor for DL assignment/UL grant control candidates for retransmission over a window of sTTIs. The window of sTTIs can be from sTTI n+x to sTTI n+x+y, where x can be determined based on a processing timeline for the UE and y can be a non-negative integer. For instance, if the minimum timing for UL grant to UL data and for DL data to DL HARQ is n+6 sTTI for short TTI operation for 2 or 3 OS sTTI, then x=6, and, for example, y=2. One or both of the values x and y can be configurable or determined based on the processing time of the sTTI operation.

According to another possible embodiment, determining the AL set for retransmissions from a detected AL corresponding to one or more of previous retransmissions can be configured for the UE.

According to another possible embodiment, a UE may expect a retransmission. For example, a UE can expect a retransmission if the UE has received a Negative Acknowledgement (NACK) from the network in response to an UL data transmission and has not yet been scheduled/sent the re-transmission in response to the NACK. A UE can also expect a retransmission if the UE has sent a NACK to the network in response to a DL data transmission and has not yet been scheduled/received the re-transmission in response to the NACK. A UE can also expect a retransmission in response to a NACK after certain number of sTTIs respecting the processing time.

According to another possible embodiment, instead of increasing AL for some of control candidates monitored when the UE expects a retransmission, the number of sREGs per sCCE can be increased in at least some of sTTIs when the UE expects a retransmission. For instance, if the UE monitors 3 sREGs per sCCE when the UE does not expect a retransmission, in a case when the UE expects a retransmission, 4 sREGs per sCCE can be considered for at least some of control decoding candidates.

According to another possible embodiment, if Discontinuous Transmission (DTX) is determined instead of NACK, such as at the eNB side on sPUCCH, as the UE may have received the DCI corresponding to the PDSCH TB it NACK'ed, the UE may be monitoring the second set of AL/candidates. The eNB can then send the re-transmission DCI in the base AL or a common search space that the UE is monitoring.

According to another possible embodiment, if DTX is determined instead of NACK, such as at the eNB side on sPUCCH, as the UE may not have received the DCI corresponding to the PDSCH TB it NACK'ed, the UE may be monitoring the second set of AL/candidates. The eNB can then send the re-transmission DCI in the base AL or a common search space that the UE is monitoring.

According to another possible embodiment, in a TTI composed of one or multiple OFDM symbols, such as sTTI, a UE can monitor control decoding candidates in a first set of ALs/control candidates if it has not been scheduled in the last number, x, of TTIs, where x can be configured or fixed. The UE can monitor control decoding candidates in a second set of ALs/control candidates if it has been scheduled in at least one TTI within the last x TTIs. According to a possible implementation, x=1, such as the previous TTI. According to a possible implementation, the first set can contain control decoding candidates with a first set of ALs and the second set can contain control decoding candidates with a second set of ALs. According to a possible implementation, the second set of control decoding candidates can be derived from the detected/decoded control decoding candidates within the last x TTIs. According to a possible implementation, the second set of control decoding candidates can contain more control decoding candidates with the same ALs as those control decoding candidates detected/decoded in the last x TTIs. The first and the second set of control decoding candidates can have the same number of control decoding candidates. According to a possible implementation, the TB in the scheduled TTI can correspond to a bearer/service with a high reliability QCI/QoS.

According to another possible embodiment, in a TTI composed of one or multiple OFDM symbols, such as a sTTI, a UE can monitor control decoding candidates in a second set of ALs/control candidates if it has been scheduled in at least one TTI within the last x TTIs and the TB in the scheduled TTI corresponds to a bearer/service with a high reliability QCI/QoS. Otherwise, the UE can monitor control decoding candidates in a first set of ALs/control candidates. The second set of ALs/control candidates can have higher ALs and can have more candidates in higher AL than the first set of ALs/control candidates. The UE can be configured with the first set and second set of ALs/control candidates.

According to a possible implementation, a monitoring set change order can be received that indicates to stop monitoring the second set of control candidates and start monitoring the first set from a TTI with non-zero positive offset relative to the TTI in which the order is received. A high reliability PDCCH monitoring timer can be started upon receiving a high reliability data packet assignment. The monitoring can be continued until expiry of the high reliability PDCCH monitoring timer. The high reliability PDCCH monitoring timer can be reset, such as upon receiving a new PDCCH assignment with high reliability PDSCH, in response to the high reliability data packet assignment. The timer and/or a number of transmit time intervals from the first transmit time interval for monitoring the second set can be configured with higher layer signaling such as a MAC-CE.

According to another possible embodiment, increasing AL for retransmission can be implicit or explicit. The explicit AL increase has been discussed above. According to a possible implicit approach for increasing AL, retransmissions can be scheduled in sTTIs having higher available REs per RB or per shortened Resource Element Group (sREG), which does not necessarily increase AL, such as the number of CCEs, but can make the control channel more reliable, which in effect can achieve a similar result to increasing AL. For instance, retransmissions can be scheduled in sTTIs not containing CRS or in sTTIs not containing higher than a threshold number of CRS REs. For example, retransmissions may not be scheduled in sTTIs with 4-port CRS. Also, retransmissions can be scheduled in sTTIs that do not have higher than a certain number reference signal REs per control RB, such as per sPDCCH RB set.

According to another possible approach for increasing AL, a hybrid explicit and implicit AL increase approach can also be possible. When a UE expects retransmissions in certain sTTIs, it can monitor control decoding candidates with the same ALs as it was monitoring when it did not expect retransmissions. These sTTIs can be the sTTIs containing higher number of available REs per control RB. When a UE expects retransmissions in other sTTIs, it can monitor control decoding candidates with at least one control decoding candidate having higher AL that the control decoding candidates monitored when the UE did not expect retransmissions.

Some embodiments below can provide solutions on how to update the set of ALs to be monitored in a sTTI. Some solutions can apply to the same set of ALs used to monitor for scheduling assignments, such as DL assignment or UL grants, corresponding to original transmission of a TB and any potential retransmission of the TB. Some solutions can also apply to the set of ALs used to monitor for scheduling assignments for original transmission of a TB. Some solutions can also apply to the base AL set to be monitored applicable to original transmission of a TB and/or when the UE expects a retransmission of a TB as discussed above. Some solutions can also apply to a detected set of ALs in the previous (re)transmission.

For the following AL set updating option, the AL set can refer to one or more of the AL sets discussed above if not distinguished specifically. To update the AL set, an eNB, based on reported channel measurements, such as CQI reports, can update the AL set via one or more of a physical layer signalling, such as a control signal applicable to a sTTI or a set of sTTIs, such as sTTIs of a subframe, the control signal can be a second level control signal containing sDCI2 and can be sent at the beginning of a subframe; a MAC layer signalling, such as a MAC CE; and/or an RRC signalling. The eNB can be triggered to update the AL set when a function of reported channel conditions has drastically changed compared to the time, such as over a certain time window, the AL set was indicated to be monitored. For instance, the drastic change can be determined when the reported measurement(s) are different by x CQI levels, where x can be fixed, such as specified, or configured. The UE can update a part of the AL set, such as the detected AL set from previous (re)transmissions, based on its channel measurements, such as recently reported CQIs.

When a Random-Access Radio Network Temporary Identifier (RA-RNTI) and either a Cell RNTI (C-RNTI) or a Semi-Persistent Scheduling (SPS) C-RNTI are assigned in the same subframe, the UE may not be required to decode a PDSCH on the primary cell indicated by a PDCCH/EPDCCH with a CRC scrambled by C-RNTI or SPS C-RNTI. Accordingly, when a RA-RNTI and either a C-RNTI or a SPS C-RNTI are assigned in the same subframe, the UE may not be required to decode a PDSCH on the primary cell indicated by a PDCCH/EPDCCH/sPDCCH with a CRC scrambled by C-RNTI or SPS C-RNTI.

There are options on how to utilize the unused control resources for sPDSCH. The main theme of some of the options can be categorized into one or combination of different schemes. According to a possible scheme, in each sTTI, quantize the control region, known to all UEs or for each UE, and signal which part is available. According to another possible scheme, in each sTTI, quantize the system or sTTI bandwidth and signal which part is available. According to another possible scheme, in each sTTI, arrange UL and DL sPDCCH candidates such that a UE by finding its own DL grant can figure out which resources in its DL allocation is usable for sPDSCH. According to another possible scheme, in each sTTI, signal unused sPDCCH-PRB sets amongst the configured sPDCCH-PRB-sets to be monitored by a UE.

Each of the above schemes may come with their own trade-offs, such as with respect to control candidate placements or with relatively coarse quantization granularity to avoid putting many bits in a DL grant in a 2OS-based DL sTTI where control overhead should be managed. A sPDSCH assigned by a sPDCCH can be mapped to resources that are left unused by any sPDCCH according to 3GPP agreements. Utilizing unused control resources for data transmission, such as for sPDSCH, can be referred to as "reuse." The reuse feasibility or reuse parameters, such as where frequency and time reuse is possible, can be indicated to a UE by physical layer signaling, such as a control signal carrying DCI, or by other signaling. A sPDCCH can be sent in a distributed manner or localized manner in terms of how sPDCCH is mapped to REs, such as mapping of sCCE to sREG mapping or control candidate to sCCE mapping.

According to a possible embodiment, the UE can be higher layer configured with which type of reuse indication, such as based on logical resources or physical resources corresponding to control resources, in a control message, such as DCI, indicated to the UE is applicable. The UE can interpret the DCI according to the reuse type to understand which control resources in time and frequency domains are available for its DL data assignment. Logical control resources can be one or more of sREG, sCCE, sPDCCH candidates, and/or other logical control resources. Physical resources can be RBs, RBGs, sRBGs, and/or other physical resources.

According to another possible embodiment, the UE can be physical layer indicated which type of reuse indication, such as based on logical resources or physical resources corresponding to control resources, is applicable to the data scheduling messages. The data scheduling message and the physical layer indication can be sent in the same control signal containing DCI.

According to another possible embodiment, if a UE is configured with distributed sPDCCH, reuse may not be enabled. Alternatively, if a UE is configured with distributed sPDCCH, reuse can be based on logical resource indication. According to another possible embodiment, if a UE is configured with localized sPDCCH, reuse can be based on physical resources.

According to another possible embodiment, a UE can be indicated a first set of unused logical control resources, and a second set of unused logical control resources, where the first set can be associated to a first mapping, such as localized, of logical resources and the second can be associated to a second mapping, such as distributed, of logical resources. The mapping can be one or more of sCCE to sREG mapping or control candidate to sCCE mapping. The logical control resources can be one or more of sREG, sCCE, sPDCCH candidate, and/or other logical control resources.

In a subframe, normally control candidates of EPDCCH and PDCCH in UE-specific search space may not be monitored simultaneously. For low-latency operation, the UE can monitor for control candidates with sDCI, such as control information associated with low-latency operation. For the first sTTI of a subframe, such as sTTI0, the sDCI may be carried in the PDCCH. Therefore, in subframes, where UE monitors EPDCCH candidates, instead of not monitoring PDCCH candidates in UE-Specific Search Space (USSS), in a possible embodiment, the UE can monitor a subset or all PDCCH candidates in USSS to be able to receive DL assignment/UL grants corresponding to low-latency operation in addition to monitoring all/some of EPDCCH candidates. In another possible embodiment, in subframes where EPDCCH candidates are usually monitored, the UE can monitor a subset of EPDCCH candidates and a subset/whole set of PDCCH candidates in USSS to decode any potential sDCI in PDCCH. In another possible embodiment, a subset of possible DCI formats, such as only DCI formats correspond to sTTI/low latency operation, for PDCCH candidates can be monitored in the subframes where EPDCCH candidates are monitored.

Figure 3:
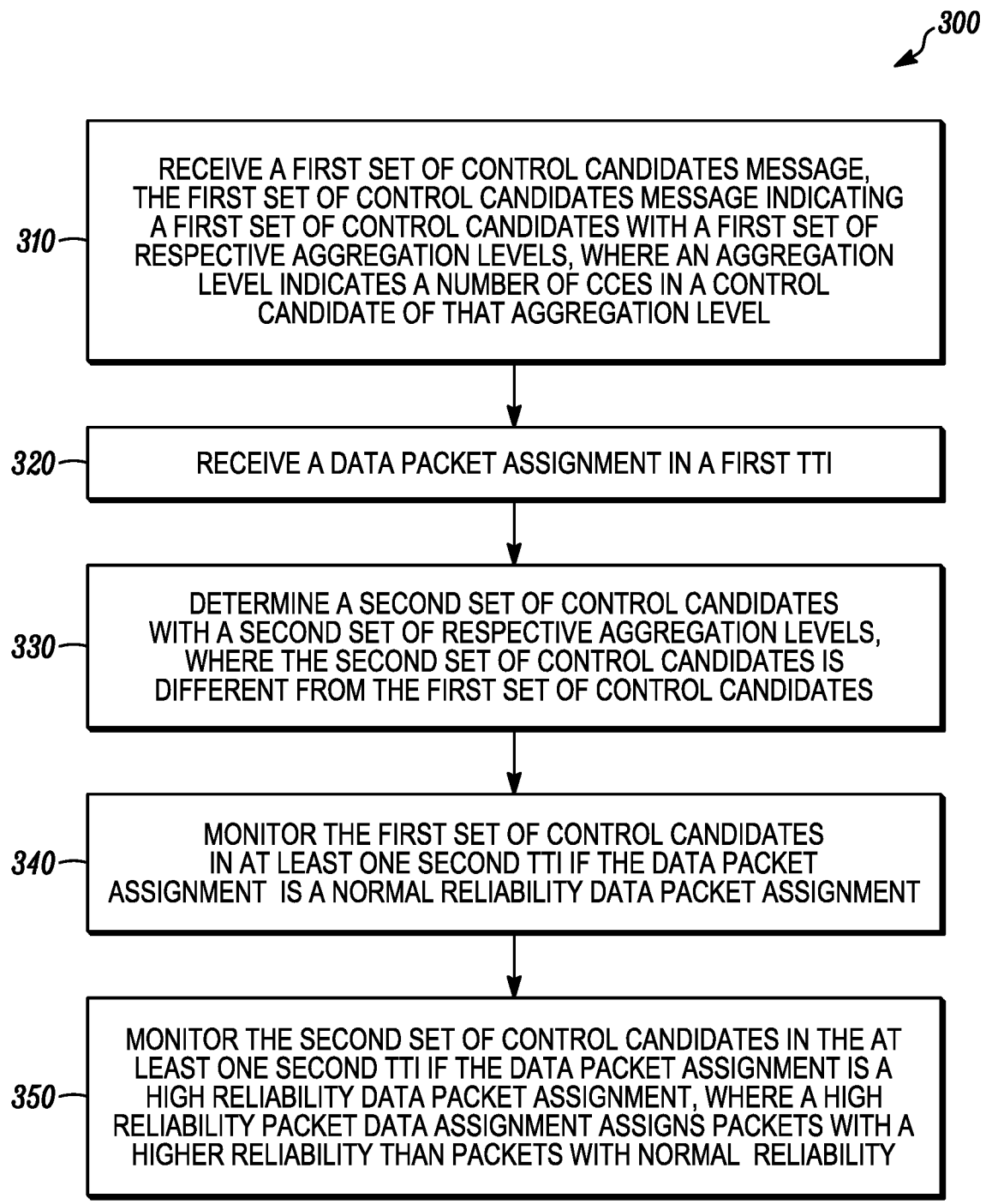
FIG. 3 is an example flowchart illustrating the operation of a wireless communication device according to a possible embodiment.

FIG. 3 is an example flowchart 300 illustrating the operation of a wireless communication device, such as the UE 110, according to a possible embodiment. At 310, a first set of control candidates message can be received. The first set of control candidates message can be an RRC message, can be a DCI message intended for multiple TTIs, and/or can be any other message that indicates a set of control candidates. The first set of control candidates message can indicate a first set of control candidates with a first set of respective aggregation levels. Thus, the term "first set of control candidates message" is used to define the message as a message that indicates a first set of control candidates, and other similar messages use similar labels. An aggregation level can indicate a number of CCEs in a control candidate of that aggregation level.

At 320, a data packet assignment can be received in a first TTI. At 330, a second set of control candidates with a second set of respective aggregation levels can be determined. A maximum aggregation level in the second set of aggregation levels can be higher than a maximum aggregation level in the first set of aggregation levels. The second set of control candidates can be different from the first set of control candidates. The first set of control candidates can contain at least one control candidate common with the second set of control candidates. A number of the second set of control candidates can be less than or equal to the number of the first set of control candidates.

According to a possible embodiment, the first set of control candidates can be in a first control resource set including a first number of resource blocks in frequency domain. The second set of control candidates can be in a second control resource set including a second number of resource blocks in frequency domain. The second number of resource blocks can be greater than or equal to the first number of resource blocks.

According to a possible embodiment, a control candidate with a first aggregation level L of the first set of control candidates can include a first number L of CCEs. Each CCE of the first number L of CCEs can include a first number x of REGs. A control candidate with a second aggregation level L' of the second set can include a second number L' of CCE's. Each CCE of the second number L' of CCEs can include a second number y of REGs. The second number y of REGs can be greater than or equal to the first number x of REGs.

At 340, the first set of control candidates can be monitored in at least one second TTI if the data packet assignment is a normal reliability data packet assignment. At 350, the second set of control candidates can be monitored in the at least one second TTI if the data packet assignment is a high reliability data packet assignment. A high reliability packet data assignment can assign packets with a higher reliability than packets with normal reliability. For example, the high reliability data packet assignment can schedule a TB with a high reliability quality of service tag. The quality of service tag can be a QoS tag, a QoS Class Identifier (QCI) tag, or any other QoS tag.

The second set of control candidates can be different from the first set of control candidates by having a different set of aggregation levels from the first set of aggregation levels, by having a different number of control candidates with the same set of aggregation levels as the first set of aggregation levels, and/or by having another characteristic different from the first set of control candidates. According to a possible embodiment, the second set of control candidates with the second set of respective aggregation levels can be determined based on the first set of control candidates with the first set of respective aggregation levels. According to another possible embodiment, channel quality of a channel between the UE and the network can be measured. A channel quality measurement report can be sent based on the measured channel quality. The second set of control candidates with the second set of respective aggregation levels can be determined based on the reported measured channel quality. According to another possible embodiment, a second set of control candidates message can be received from a network. The second set of control candidates with the second set of respective aggregation levels can be determined based on the second set of control candidates message. The second set of control candidates message can be part of or can be different from the first set of a control candidates message.

Monitoring the second set can include monitoring the second set of control candidates for a number x of TTIs from the first TTI in response to receiving the high reliability data packet assignment, where the number x of TTIs can include the at least one second TTI. The number x of TTIs can be indicated by a network. For example, the number x of TTIs can be indicated in an RRC message, in a DCI message, or otherwise indicated. According to a possible implementation, instead of monitoring the second set for a number x of TTIs, a timer can be set for monitoring the second set of control candidates.

According to a possible embodiment, another high reliability data packet assignment can be received in the third TTI in the number x of TTIs from the first TTI. The second set of control candidates can be monitored for the number x of TTIs from the third TTI in the number x of TTIs from the first TTI if another high reliability data packet assignment is received in the third TTI. The first set of control candidates can be monitored after the number x of TTIs from the first TTI if another high reliability data packet assignment is not received in the number x of TTIs from the first TTI. For example, if a high reliability data packet assignment is received in a TTI, such as the third TTI, in the number x of TTIs from the first TTI, the UE can continue monitoring the second set of control candidates in the number x of TTIs from the third TTI. According to a possible implementation, the number x may be further based on network processing time for scheduling of re-transmission and may also be based on scheduling delay, TTI for PDCCH transmission, UE processing delay for PDCCH decoding, and/or other factors.

According to a possible embodiment, a NACK can be sent in a third TTI in response to the high reliability data packet assignment if the data packet assignment is a high reliability data packet assignment. For example, the NACK can be sent if a packet from the high reliability data packet assignment is not correctly decoded. Monitoring the second set can then include monitoring the second set of control candidates for a number of TTIs from the third TTI. The number of TTIs can include the at least one second TTI. The number of TTIs from the third TTI can be based on processing time for the network to process the NACK.

According to a possible embodiment, an UL data packet can be sent in response to receiving the high reliability data packet assignment if the data packet assignment is a high reliability data packet assignment. An indication can be received in a third TTI in response to sending the UL data packet. The indication can indicate the UL data packet was not correctly, such as successfully, decoded. Monitoring the second set can then include monitoring the second set of control candidates for a number of TTIs from the third TTI. The number of TTIs can include the at least one second TTI. For example, the indication can be a NACK, can be a New Data Indicator (NDI) in an UL assignment, can be an implicit indication, and/or can be any other indication that indicates a UL data packet was not correctly decoded.

Figure 4:
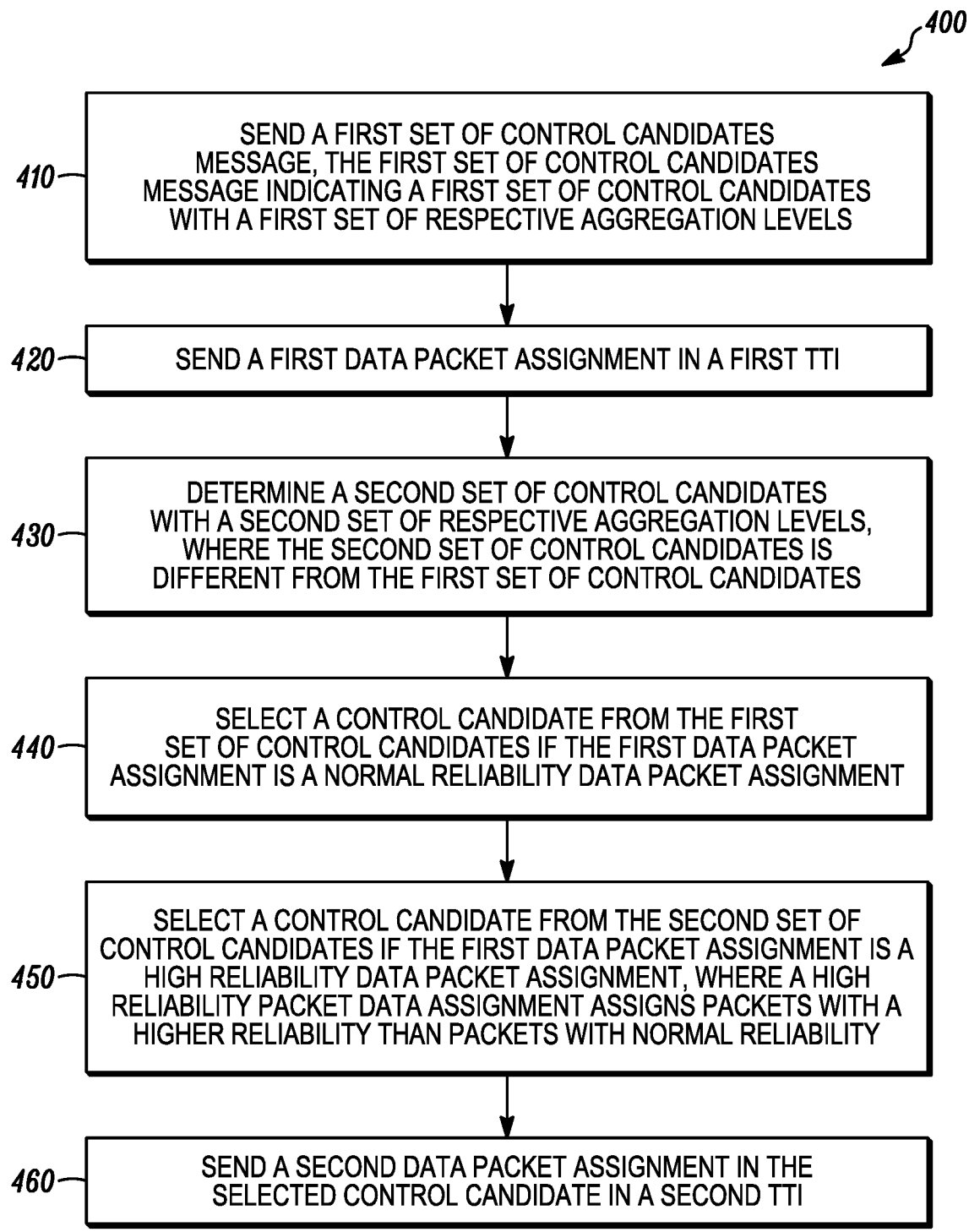
FIG. 4 is an example flowchart illustrating the operation of a wireless communication device according to a possible embodiment.

FIG. 4 is an example flowchart 400 illustrating the operation of a wireless communication device, such as a network entity, according to a possible embodiment. At 410, a first set of control candidates message can be sent. The first set of control candidates message can indicate a first set of control candidates with a first set of respective aggregation levels. At 420, a first data packet assignment can be sent in a first TTI.

At 430, a second set of control candidates with a second set of respective aggregation levels can be determined. The second set of control candidates can be different from the first set of control candidates. The second set of control candidates can be different from the first set of control candidates by having a different set of aggregation levels from the first set of aggregation levels, by having a different number of control candidates with the same set of aggregation levels, or by otherwise being different from the first set of control candidates. According to a possible embodiment, the first set of control candidates can contain at least one control candidate common with the second set of control candidates. According to a possible embodiment, a number of the second set of control candidates can be less than or equal to the number of the first set of control candidates. According to a possible embodiment, the aggregation level in the second set of aggregation levels can be higher than the maximum aggregation level in the first set of aggregation levels.

According to a possible embodiment, the first set of control candidates can be in a first control resource set including a first number of resource blocks. The second set of control candidates can be in a second control resource set including a second number of resource blocks. The second number of resource blocks can be greater than or equal to the first number of resource blocks.

According to a possible embodiment, a control candidate with a first aggregation level L of the first set of control candidates can include a first number L of CCEs. Each CCE of the first number L of CCEs can include a first number x of REGs. A control candidate with a second aggregation level L' of the second set can include a second number L' of CCE's. Each CCE of the second number L' of CCEs can include a second number y of REGs. The second number y of REGs can be greater than or equal to the first number x of REGs.

According to a possible embodiment, the second set of control candidates with the second set of respective aggregation levels can be determined based on the first set of control candidates with the first set of respective aggregation levels. According to another possible embodiment, a channel quality measurement report can be received based on the measured channel quality. The second set of control candidates with the second set of respective aggregation levels can be determined based on the received channel quality measurement report. According to another possible embodiment a second set of control candidates message can be sent. The second set of control candidates with the second set of respective aggregation levels can be determined based on the second set of control candidates message.

At 440, a control candidate can be selected from the first set of control candidates if the first data packet assignment is a normal reliability data packet assignment. At 450, a control candidate can be selected from the second set of control candidates if the first data packet assignment is a high reliability data packet assignment. A high reliability packet data assignment can assign packets with a higher reliability than packets with normal reliability. For example, the high reliability data packet assignment can schedule a TB with a high reliability quality of service tag.

According to a possible embodiment, a number x of TTIs from the first TTI can be indicated for monitoring the second set of control candidates. The number x of TTIs can include the at least one second TTI.

At 460, a second data packet assignment can be sent in the selected control candidate in a second TTI. According to a possible embodiment, a NACK can be received in a third TTI in response to the high reliability data packet assignment if the first data packet assignment is a high reliability data packet assignment. The second data packet assignment can be sent in the control candidate selected from the second set of control candidates for a number of TTIs from the third TTI, where the number of TTIs can include the at least one second TTI. The number of TTIs from the third TTI can be based on processing time for the network to process the NACK.

According to another possible embodiment, an UL data packet can be received in response to sending the high reliability data packet assignment if the first data packet assignment is a high reliability data packet assignment. An indication can be sent in a third TTI in response to receiving the UL data packet. The indication can indicate the UL data packet was not correctly, such as successfully, decoded. The second data packet assignment can be sent in the control candidate selected from second set of control candidates for a number of TTIs from the third TTI. The number of TTIs can include the second TTI.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 5:
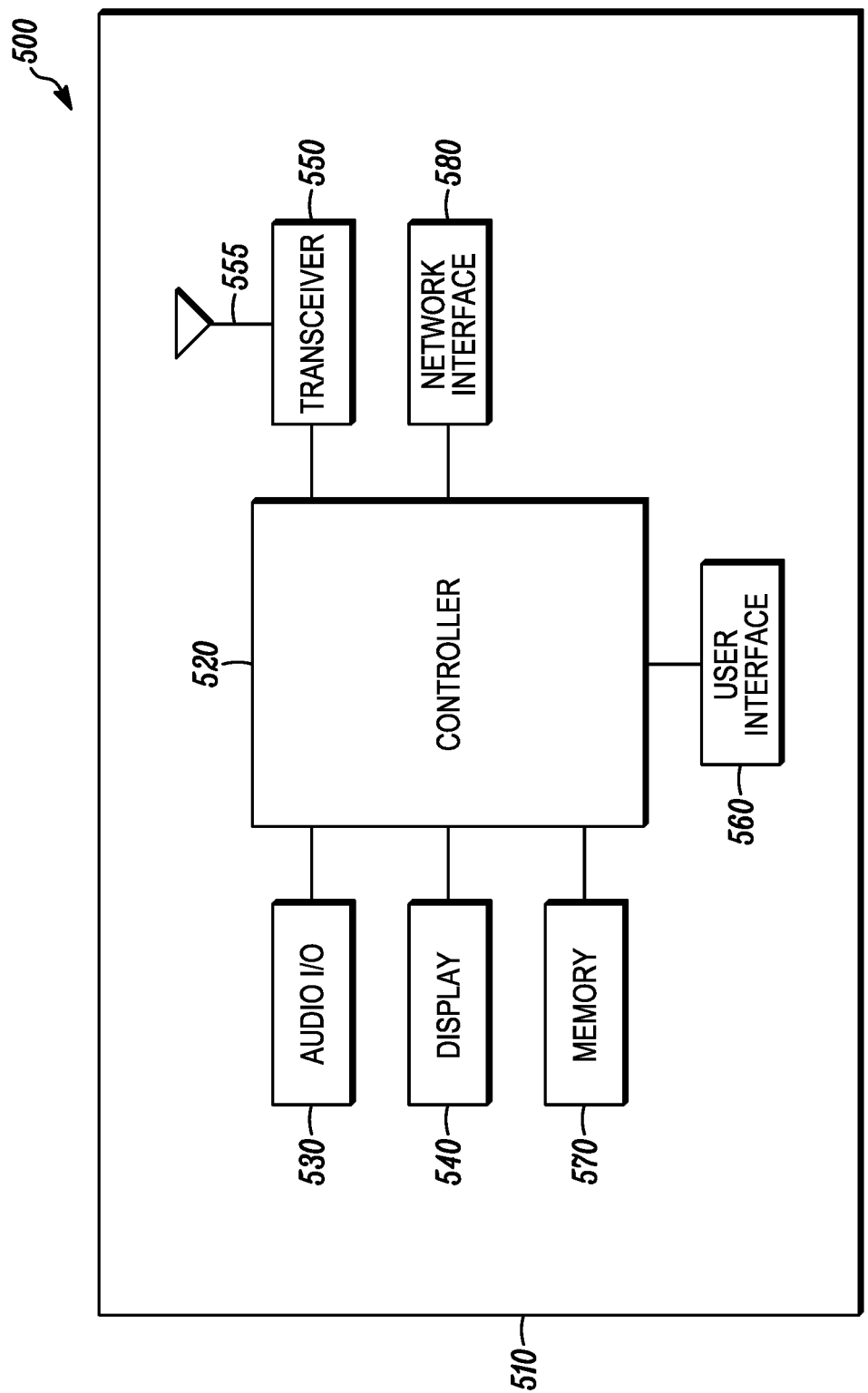
FIG. 5 is an example block diagram of an apparatus according to a possible embodiment

FIG. 5 is an example block diagram of an apparatus 500, such as the wireless communication device 110, the base station 120, an access point, a network entity, and/or any other wireless communication device according to a possible embodiment. The apparatus 500 can include a housing 510, a controller 520 within the housing 510, audio input and output circuitry 530 coupled to the controller 520, a display 540 coupled to the controller 520, a transceiver 550 coupled to the controller 520, an antenna 555 coupled to the transceiver 550, a user interface 560 coupled to the controller 520, a memory 570 coupled to the controller 520, and a network interface 580 coupled to the controller 520. The apparatus 500 can perform the methods described in all the embodiments.

The display 540 can be a viewfinder, a liquid crystal display (LCD), a light emitting diode (LED) display, a plasma display, a projection display, a touch screen, or any other device that displays information. The transceiver 550 can include a transmitter and/or a receiver. The audio input and output circuitry 530 can include a microphone, a speaker, a transducer, or any other audio input and output circuitry. The user interface 560 can include a keypad, a keyboard, buttons, a touch pad, a joystick, a touch screen display, another additional display, or any other device useful for providing an interface between a user and an electronic device. The network interface 580 can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals. The memory 570 can include a random access memory, a read only memory, an optical memory, a flash memory, a removable memory, a hard drive, a cache, or any other memory that can be coupled to an apparatus.

The apparatus 500 or the controller 520 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 570 or elsewhere on the apparatus 500. The apparatus 500 or the controller 520 may also use hardware to implement disclosed operations. For example, the controller 520 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 520 may be any controller or processor device or devices capable of operating an apparatus and implementing the disclosed embodiments. Some or all of the additional elements of the apparatus 500 can also perform some or all of the operations of the disclosed embodiments.

According to a possible embodiment in operation as a UE, the transceiver 550 can receive a first set of control candidates message. The first set of control candidates message can indicate a first set of control candidates with a first set of respective aggregation levels. An aggregation level can indicate a number of CCEs in a control candidate of that aggregation level. The transceiver 550 can receive a data packet assignment in a first TTI. The controller 520 can determine a second set of control candidates with a second set of respective aggregation levels. The second set of control candidates can be different from the first set of control candidates.

The controller 520 can monitor the first set of control candidates in at least one second TTI if the data packet assignment is a normal reliability data packet assignment. The controller 520 can monitor the second set of control candidates in the at least one second TTI if the data packet assignment is a high reliability data packet assignment. According to a possible implementation, the controller 520 can monitor the second set of control candidates for a number x of TTIs from the first TTI in response to receiving the high reliability data packet assignment. The number x of TTIs can include the at least one second TTI.

According to a possible embodiment, the transceiver 550 can send a NACK in a third TTI in response to the high reliability data packet assignment if the data packet assignment is a high reliability data packet assignment and the data packet was not received. The controller 520 can monitor the second set of control candidates for a number of TTIs from the third TTI. The number of TTIs can include the at least one second TTI.

According to another possible embodiment, the transceiver 550 can send an UL data packet in response to receiving the high reliability data packet assignment if the data packet assignment is a high reliability data packet assignment. The transceiver 550 can receive an indication in a third TTI in response to sending the UL data packet. The indication can indicate the UL data packet was not correctly, such as successfully, decoded. The controller 520 can monitor the second set of control candidates for a number of TTIs from the third TTI. The number of TTIs can include the at least one second TTI.

According to a possible embodiment in operation as a NE, the transceiver 550 can send a first set of control candidates message. The first set of control candidates message can indicate a first set of control candidates with a first set of respective aggregation levels. The transceiver 550 can send a first data packet assignment in a first TTI.

The controller 520 can determine a second set of control candidates with a second set of respective aggregation levels. The second set of control candidates can be different from the first set of control candidates. The second set of control candidates can be different from the first set of control candidates by having a different set of aggregation levels from the first set of aggregation levels, by having a different number of control candidates with the same set of aggregation levels, and/or by otherwise being different.

The controller 520 can select a control candidate from the first set of control candidates if the first data packet assignment is a normal reliability data packet assignment. The controller 520 can select a control candidate from the second set of control candidates if the first data packet assignment is a high reliability data packet assignment. A high reliability packet data assignment can assign packets with a higher reliability than packets with normal reliability. For example, a high reliability data packet assignment can schedule a TB with a high reliability quality of service tag.

According to a possible embodiment, the controller 520 can indicate a number x of TTIs from the first TTI for monitoring the second set of control candidates. The number x of TTIs can include the at least one second TTI.

The transceiver 550 can send a second data packet assignment in the selected control candidate in a second TTI. According to a possible embodiment, the transceiver 550 can receive a NACK in a third TTI in response to the high reliability data packet assignment if the first data packet assignment is a high reliability data packet assignment. The transceiver 550 can send the second data packet assignment in the control candidate selected from the second set of control candidates for a number of TTIs from the third TTI. The number of TTIs can include the at least one second TTI.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. A method comprising:
   receiving a first set of control candidates message, the first set of control candidates message indicating a first set of control candidates with a first set of respective aggregation levels, where an aggregation level indicates a number of control channel elements in a control candidate of the aggregation level;
   receiving a data packet assignment in a first transmit time interval;
   determining a second set of control candidates with a second set of respective aggregation levels, where the second set of control candidates is different from the first set of control candidates;
   monitoring the first set of control candidates in at least one second transmit time interval if the data packet assignment is a normal reliability data packet assignment; and
   monitoring the second set of control candidates in the at least one second transmit time interval if the data packet assignment is a high reliability data packet assignment, where a high reliability packet data assignment assigns packets with a higher reliability than packets with normal reliability.

2. The method according to claim 1, wherein the high reliability data packet assignment schedules a transport block with a high reliability quality of service tag.

3. The method according to claim 1, wherein the second set of control candidates is different from the first set of control candidates by at least one selected from having a different set of aggregation levels from the first set of aggregation levels and having a different number of control candidates with the same set of aggregation levels as the first set of aggregation levels.

4. The method according to claim 1, wherein monitoring the second set comprises monitoring the second set of control candidates for a number of transmit time intervals from the first transmit time interval in response to receiving the high reliability data packet assignment, where the number of transmit time intervals includes the at least one second transmit time interval.

5. The method according to claim 4, further comprising:
monitoring the second set of control candidates for the number of transmit time intervals from a third transmit time interval in the number of transmit time intervals from the first transmit time interval if another high reliability data packet assignment is received in the third transmit time interval; and
monitoring the first set of control candidates after the number of transmit time intervals from the first transmit time interval if another high reliability data packet assignment is not received in the number of transmit time intervals from the first transmit time interval.

6. The method according to claim 1, further comprising sending a negative acknowledgement in a third transmit time interval in response to the high reliability data packet assignment if the data packet assignment is a high reliability data packet assignment,
wherein monitoring the second set comprises monitoring the second set of control candidates for a number of transmit time intervals from the third transmit time interval, where the number of transmit time intervals includes the at least one second transmit time interval.

7. The method according to claim 6, wherein the number of transmit time intervals from the third transmit time interval is based on processing time for the network to process the negative acknowledgement.

8. The method according to claim 1, further comprising
sending an uplink data packet in response to receiving the high reliability data packet assignment if the data packet assignment is a high reliability data packet assignment; and
receiving an indication in a third transmit time interval in response to sending the uplink data packet, the indication indicating the uplink data packet was not correctly decoded,
wherein monitoring the second set comprises monitoring the second set of control candidates for a number of transmit time intervals from the third transmit time interval, where the number of transmit time intervals includes the at least one second transmit time interval.

9. The method according to claim 1, wherein the second set of control candidates with the second set of respective aggregation levels is determined based on the first set of control candidates with the first set of respective aggregation levels.

10. The method according to claim 1, further comprising:
measuring channel quality of a channel between the UE and the network; and
sending a channel quality measurement report based on the measured channel quality,
wherein the second set of control candidates with the second set of respective aggregation levels is determined based on the reported measured channel quality.

11. The method according to claim 1, further comprising receiving a second set of control candidates message from a network,
wherein the second set of control candidates with the second set of respective aggregation levels is determined based on the second set of control candidates message.

12. The method according to claim 1, wherein the first set of control candidates contains at least one control candidate common with the second set of control candidates.

13. The method according to claim 1, where a number of the second set of control candidates is less than or equal to the number of the first set of control candidates.

14. The method according to claim 1, wherein a maximum aggregation level in the second set of aggregation levels is higher than a maximum aggregation level in the first set of aggregation levels.

15. The method according to claim 1,
wherein the first set of control candidates is in a first control resource set including a first number of resource blocks in frequency domain,
wherein the second set of control candidates is in a second control resource set including a second number of resource blocks in frequency domain, and
wherein the second number of resource blocks is greater than or equal to the first number of resource blocks.

16. The method according to claim 1,
wherein a control candidate with a first aggregation level of the first set of control candidates comprises a first number of control channel elements, where each control channel element of the first number of control channel elements comprises a first number of resource element groups,
wherein a control candidate with a second aggregation level of the second set comprises a second number of control channel element's, where each control channel element of the second number of control channel elements comprises a second number of resource element groups, and
wherein the second number of resource element groups is greater than or equal to the first number of resource element groups.

17. The method according to claim 1,
wherein monitoring the first set of control candidates comprises monitoring the first set of control candidates in the at least one second transmit time interval based on the data packet assignment being a normal reliability data packet assignment, and wherein monitoring the second set of control candidates comprises monitoring the second set of control candidates in the at least one second transmit time interval based on the data packet assignment being a high reliability data packet assignment.

18. The method according to claim 1, wherein neither of the first set of control candidates nor the second set of control candidates contain a repetition of the data packet assignment.

19. An apparatus comprising:
a transceiver that receives a first set of control candidates message, the first set of control candidates message indicating a first set of control candidates with a first set of respective aggregation levels, where an aggregation level indicates a number of control channel elements in a control candidate of the aggregation level, and receives a data packet assignment in a first transmit time interval; and
a controller coupled to the transceiver, where the controller determines a second set of control candidates with a second set of respective aggregation levels, where the second set of control candidates is different from the first set of control candidates, monitors the first set of control candidates in at least one second transmit time interval if the data packet assignment is a normal reliability data packet assignment, and monitors the second set of control candidates in the at least one second transmit time interval if the data packet assignment is a high reliability data packet assignment.

20. The apparatus according to claim 19, wherein the controller monitors the second set of control candidates for a number of transmit time intervals from the first transmit time interval in response to receiving the high reliability data packet assignment, where the number of transmit time intervals includes the at least one second transmit time interval.

21. The apparatus according to claim 19, wherein the transceiver sends a negative acknowledgement in a third transmit time interval in response to the high reliability data packet assignment if the data packet assignment is a high reliability data packet assignment, and wherein the controller monitors the second set of control candidates for a number of transmit time intervals from the third transmit time interval, where the number of transmit time intervals includes the at least one second transmit time interval.

22. The apparatus according to claim 19, wherein the transceiver sends an uplink data packet in response to receiving the high reliability data packet assignment if the data packet assignment is a high reliability data packet assignment, and receives an indication in a third transmit time interval in response to sending the uplink data packet, the indication indicating the uplink data packet was not correctly decoded, and wherein the controller monitors the second set of control candidates for a number of transmit time intervals from the third transmit time interval, where the number of transmit time intervals includes the at least one second transmit time interval.

23. The apparatus according to claim 19, wherein the controller monitors the first set of control candidates in the at least one second transmit time interval based on the data packet assignment being a normal reliability data packet assignment, and wherein the controller monitors the second set of control candidates in the at least one second transmit time interval based on the data packet assignment being a high reliability data packet assignment.

24. The apparatus according to claim 19, wherein neither of the first set of control candidates nor the second set of control candidates contain a repetition of the data packet assignment.

* * * * *